Feb. 27, 1968 W. S. PEPPLER 3,370,516

BOTTLE CARRIER ASSEMBLY MACHINE

Filed Jan. 25, 1966 7 Sheets-Sheet 1

INVENTOR

WILLIAM S. PEPPLER

BY Karl W. Flocks

ATTORNEY

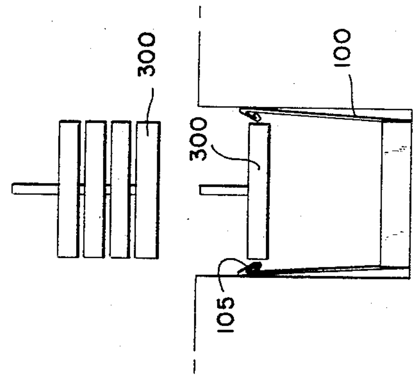
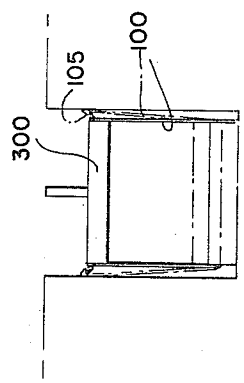
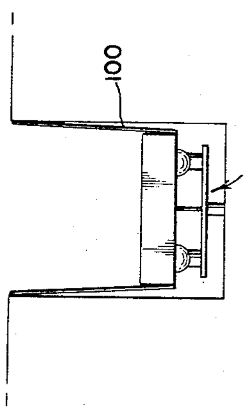
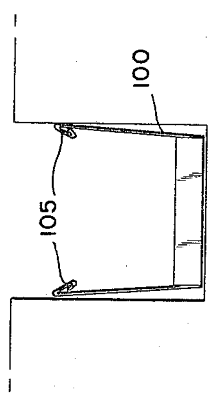
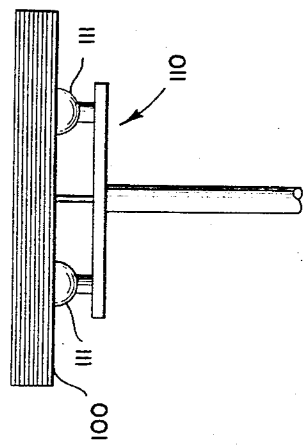
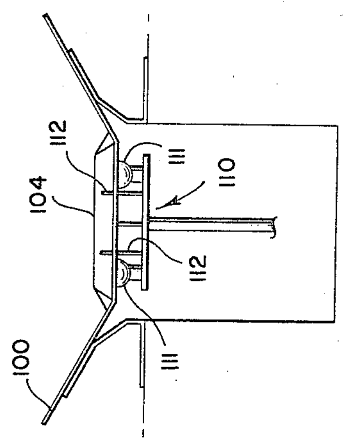
INVENTOR
WILLIAM S. PEPPLER
BY Karl W. Flocks
ATTORNEY Feb. 27, 1968 W. S. PEPPLER 3,370,516

BOTTLE CARRIER ASSEMBLY MACHINE

Filed Jan. 25, 1966 7 Sheets-Sheet 3

INVENTOR
WILLIAM S. PEPPLER

BY Karl W. Flocks
ATTORNEY

INVENTOR

WILLIAM S. PEPPLER

BY

Karl W. Flocks
ATTORNEY

Feb. 27, 1968 W. S. PEPPLER 3,370,516
BOTTLE CARRIER ASSEMBLY MACHINE
Filed Jan. 25, 1966 7 Sheets-Sheet 5
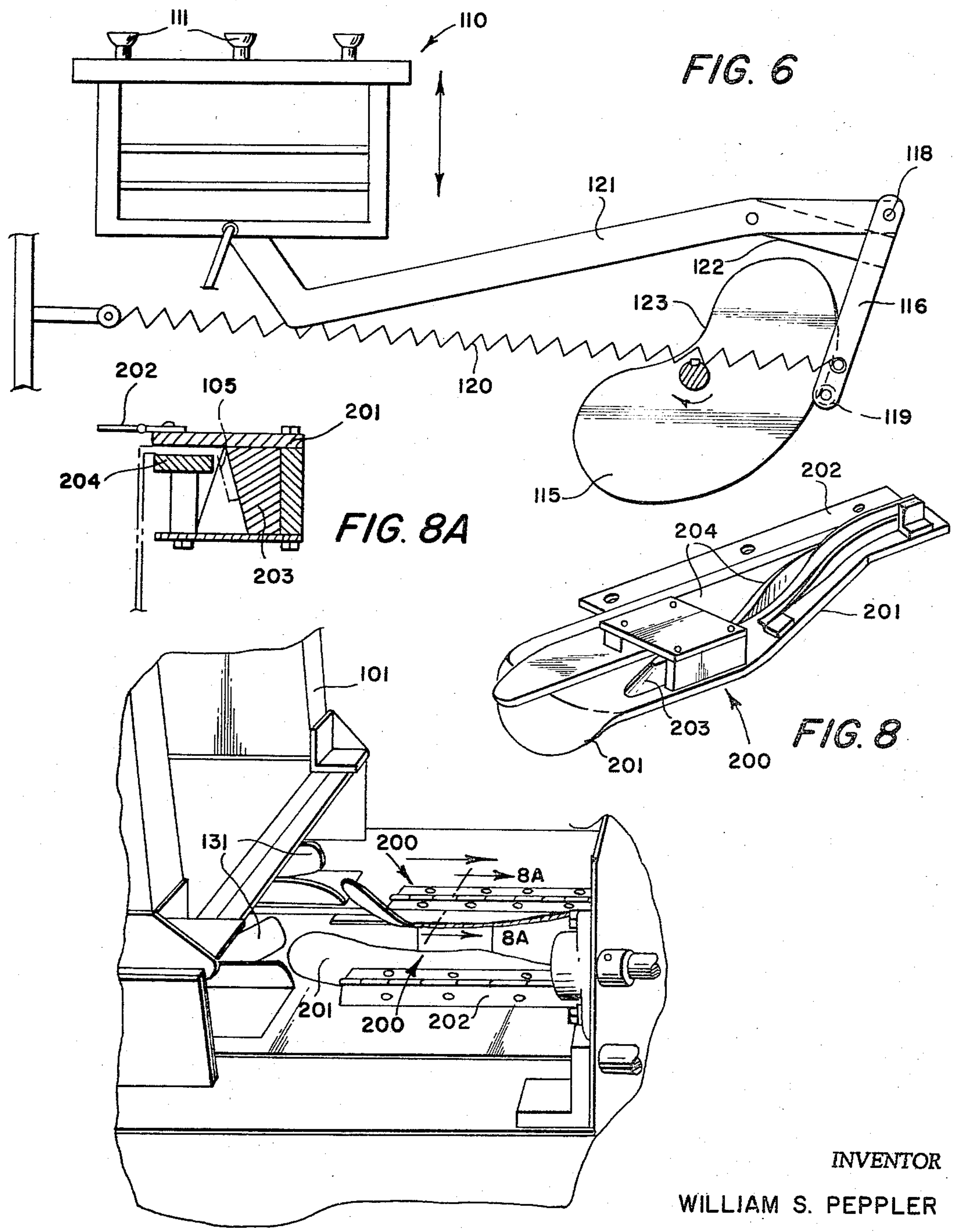
INVENTOR
WILLIAM S. PEPPLER
BY Karl W. Flocks
ATTORNEY

INVENTOR
WILLIAM S. PEPPLER

BY [signature]
ATTORNEY

INVENTOR
WILLIAM S. PEPPLER

BY

ATTORNEY

United States Patent Office 3,370,516

Patented Feb. 27, 1968

3,370,516

BOTTLE CARRIER ASSEMBLY MACHINE

William S. Peppler, Chappaqua, N.Y., assignor to Diamond International Corporation, New York, N.Y., a corporation of Delaware Filed Jan. 25, 1966, Ser. No. 522,970
14 Claims. (Cl. 93—36)

The present invention relates to a machine for assembling a bottle carrier or similar article formed from at least two component parts and more particularly to a machine for assembling combination paperboard and plastic or similar substance bottle or can carriers.

The machine of the present invention is a compact high speed machine for assembling the comination paperboard and plastic or similar substance bottle carriers which obtains higher speeds and avoids complex motions of operating mechanisms by forming and assembling the carrier in three general stages. In the first stage the preformed paperboard blank is erected from its original flattened condition. In the next stage the locking tabs of the paperboard blank are formed, thereby completing the formation of the paperboard section of the carrier. The third stage involves the mating of this paperboard section with the plastic handle section and the final locking together of these two components of the carrier.

These, as well as further advantages which are inherent in the invention, will become apparent from the following description reference being had to the accompanying drawings wherein:

FIG. 1 is an overall perspective view of the assembly machine of the present invention;

FIGS. 2*a*–2*f* illustrate the steps in the assembly of a carton blank and its attachment to a plastic handle section;

FIG. 6 illustrates the mechanism for vertically reciprocating the vacuum cup assembly through the positions shown in FIGS. 4 and 5;

FIG. 7 is a perspective view of that portion of the machine in which the paperboard locking tabs are formed;

FIG. 8 is an inverted view of one of the folding bars illustrated in FIG. 7;

Figure 1:
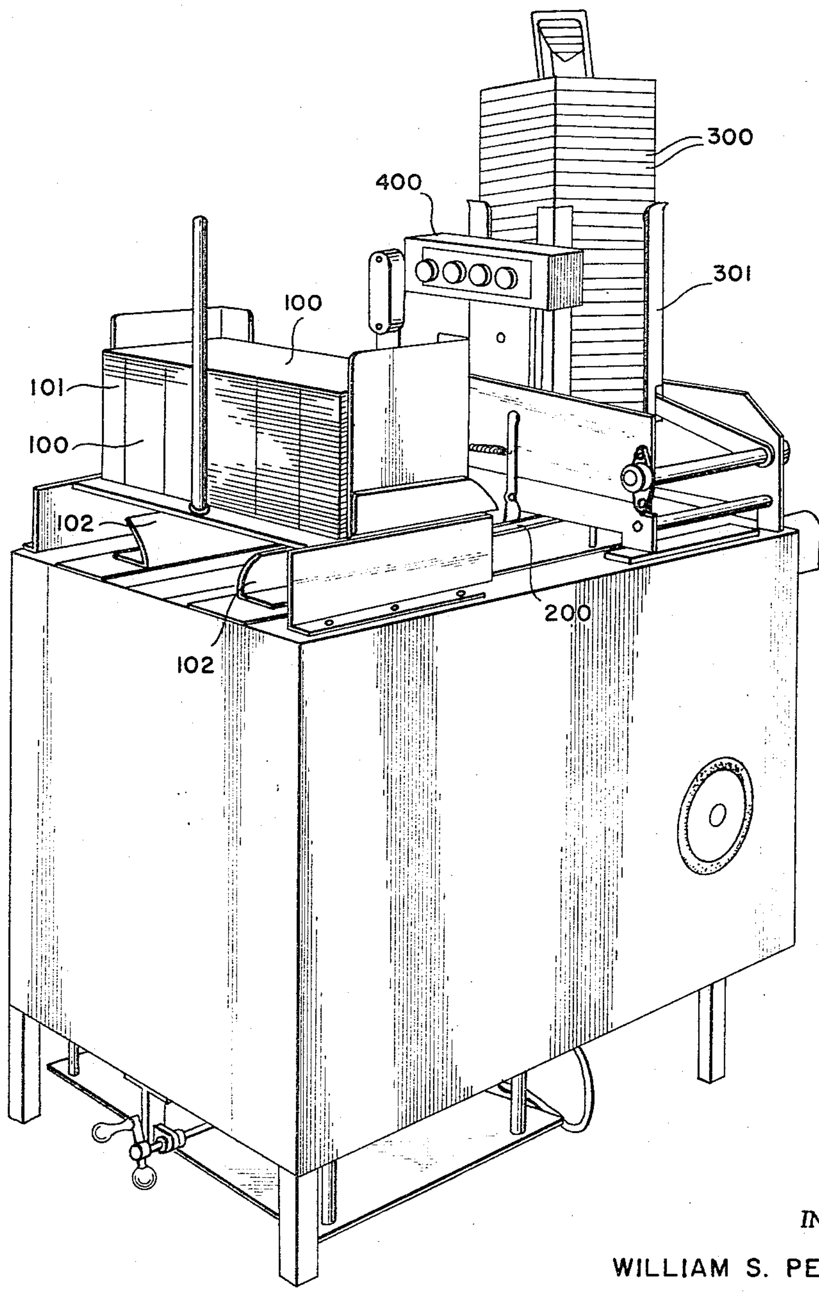
Figure 9:
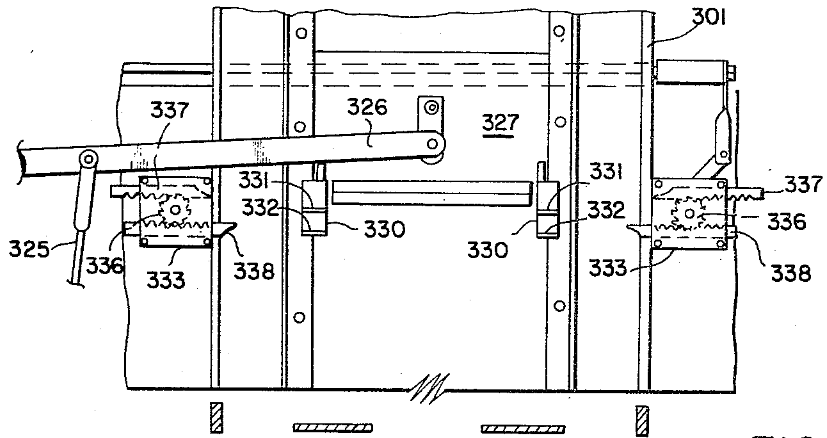
Figure 10:
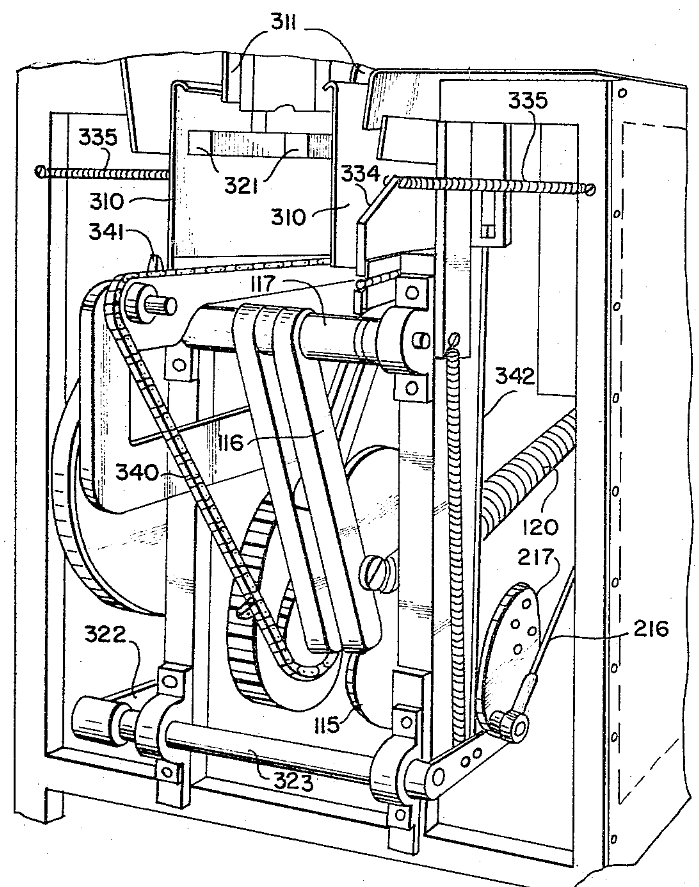
Figure 11:
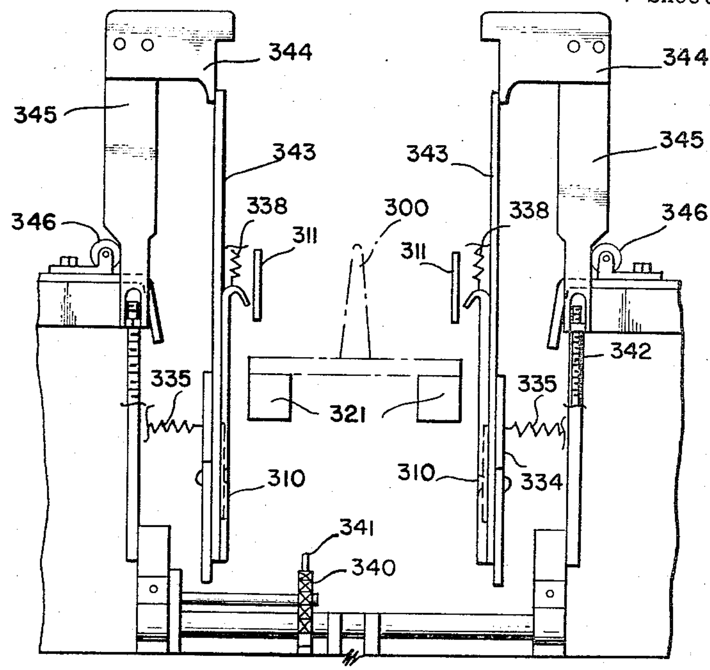
Figure 12:
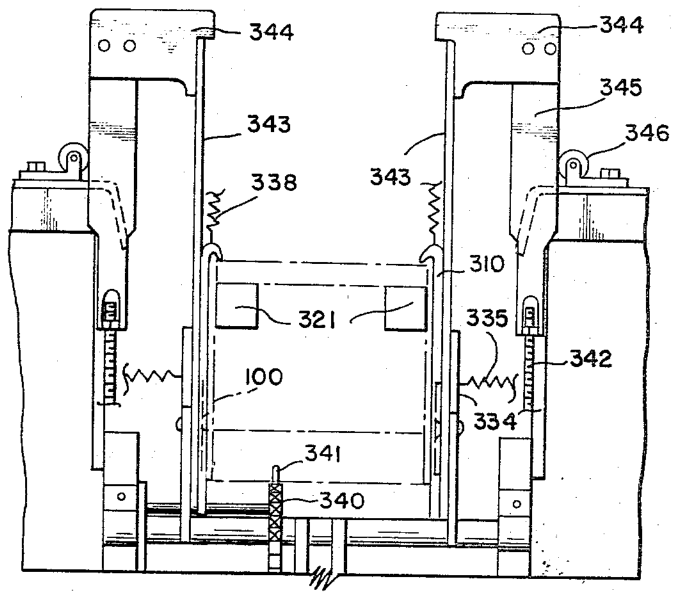

FIG. 8*a* is a sectioned view of a folding bar along line 8A—8A of FIG. 7;

FIG. 9 is a partial elevation view of the handle dropping mechanism;

FIG. 10 is a partial perspective view of the lower portion of the discharge end of the machine;

FIGS. 11 and 12 are partial end elevation views showing the final locking mechanism connecting the handle section with the preformed erected carton blank In FIG. 1 the machine of the present invention is illustrated in an overall perspective view thereof. A stack of carrier blanks 100 are held in a magazine 101 directly above a pair of mutually facing upward and outward shaped sloping walls 102 located at the first station of the machine where the paperboard or similar material blanks 100 are erected into a container form. Adjacent to the first station is the second station of the machine wherein paperboard locking tabs are formed by folding bars 200. The final assembly station or third station is placed beyond the folding bars 200 and contains a stack of plastic or similar substance handle sections 300 held in a holder 301 over the third station in which a carrier blank 100 and a plastic handle section 300 are locked together to form the finished carrier which is then discharged from this end of the machine.

Also shown in FIG. 1 is a four pushbutton switch 400 which can be placed in any convenient location on the machine and which operates to control vacuum input, starting and stopping, and clutching of the machine.

The steps leading to the assembly of the finished carrier are illustrated in FIGS. 2*a*–2*f*. Vacuum cups 111 in an assembly mounted for vertical reciprocation are shown in FIG. 2*a* at their highest point in this vertical motion with the vacuum cups 111 pressed against the bottom blank 100 held in magazine 101. Vacuum cup assembly 110 is then started on the downward path of vertical reciprocation. As vacuum cups 111 are moved in a downward direction cam operated pins 112 move upward in relation to vacuum cups 111 and pass through pre-cut holes in the bottom of blank 100, thereby raising end panels 104 of blank 100 as shown in FIG. 2*b*. Vacuum cup assembly 110 is shown at the lowest point in its vertical reciprocal movement in FIG. 2*c*. In this position the side walls of the blank 100 are almost in a vertical position but slightly spread. In FIG. 2*d* blank 100 has passed through the second station where the locking tabs 105 have been folded nearly 360°. Carton blank 100 is then moved to the third station where simultaneously with this movement into the third station as illustrated in FIG. 2*e*, a plastic or similar substance handle section, separated from the stack of such handle sections suspended thereabove, is brought down between the upstanding sides of blank 100. In the final assembly step illustrated in FIG. 2*f*, the side walls of blank 100 are swung inward and with tabs 105 properly positioned over plastic handle section 300, carton blank 100 is moved downward to drive locking tabs 105 downward into the handle section 300. As an alternative procedure to this last step shown in FIG. 2*f*, after handle section 300 has been positioned between side walls of blank 100 and the side walls have been swung inward, the mechanism of the machine may be so connected as to then raise handle section 300, thereby also causing locking tabs 105 to pass into handle section 300 and lock thereto. It should also be noted in this procedure for connecting carton blank 100 with handle section 300 that the machine can be readily adapted for other folds of the locking tabs 105 such as a 180° fold if the locks on the handle sections 300 are designed to accept and lock with such a fold.

The above method of combining the carton blank and a handle section, discussed in general in relation to FIGS. 2*a* through 2*f*, is carried out in the machine of the present invention having interconnected mechanism for controlling the movement of the different parts of the machine at the three main stations. This mechanism is shown in FIG. 3 but is best explained in conjunction with the individual parts as shown in the remaining figures.

Figure 4:
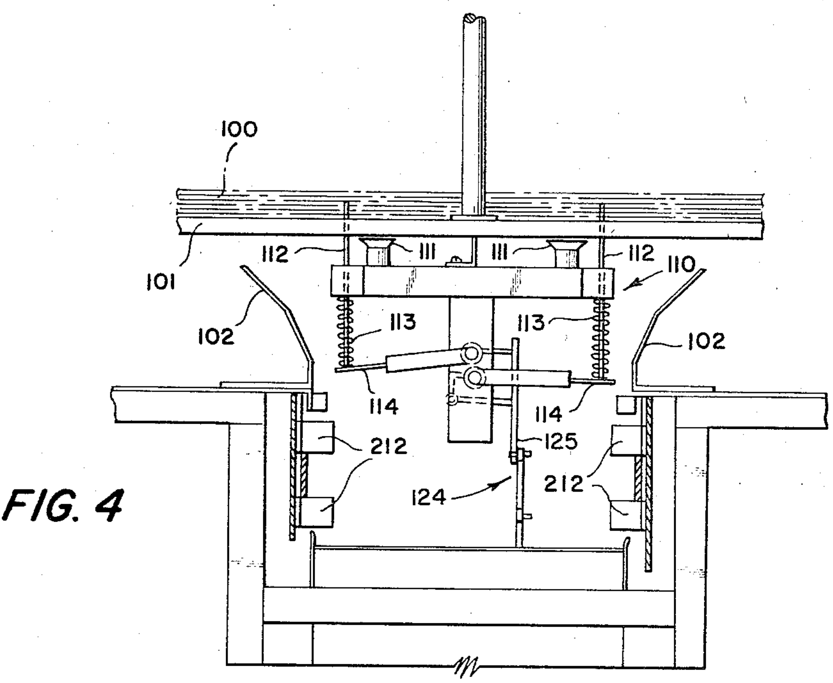
FIGS. 4 and 5 are partial end elevations showing cut away views of the end of the machine of FIG. 1 at different positions of the vacuum cup assembly illustrating the stage of assembly wherein the paperboard blank is erected.
Figure 5:
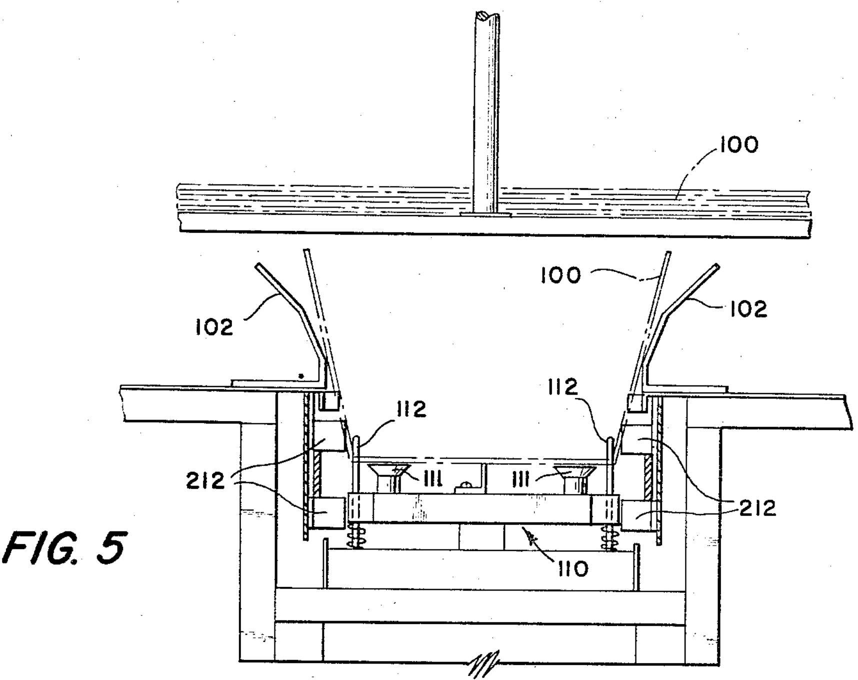

FIGS. 4 and 5 show vacuum cup assembly 110 in a raised position and then in a partially lowered position respectively. In FIG. 4 with the vacuum cup assembly 110 at its top position of reciprocation the vacuum cups 111 are pressed against the bottom blank 100 held in the stack in magazine 101. This is equivalent to their position in FIG. 2*a*. In this position of the vacuum cup assembly 110, pins 112 with springs 113 are in a lowered position in relation to vacuum cups 111, the tops of pins 112 being below the level of the vacuum cups. Attached to the vacuum cup assembly 10 are arm mechanisms 114 to control the movement of pins 112.

The next step in the formation of the carton as illustrated diagrammatically in FIG. 2*b* is the lowering of vacuum cup assembly 110. FIG. 5 illustrates this mechanism in a partially lowered position with the vacuum cups 111 gripping a carrier blank 100 after having pulled it from the bottom of the stack placed thereabove. With the downward movement of vacuum cup assembly 110, blank 100 is pulled between upward and outward sloping walls 102 and at the same time pins 112 are moved in an upward direction relative to vacuum cups 111 by operation of arms 114 against the force of springs 113. In their upward motion the pins 112 protrude through openings pre-cut in the bottom of the blank 100 and thus are used to help raise the end flaps 104, depending upon the design of the carton blanks 100. Such pins 112 may or may not be necessary with the machine of the present invention but can be used with the mechanism built into the present assembly machine if needed.

Figure 3:
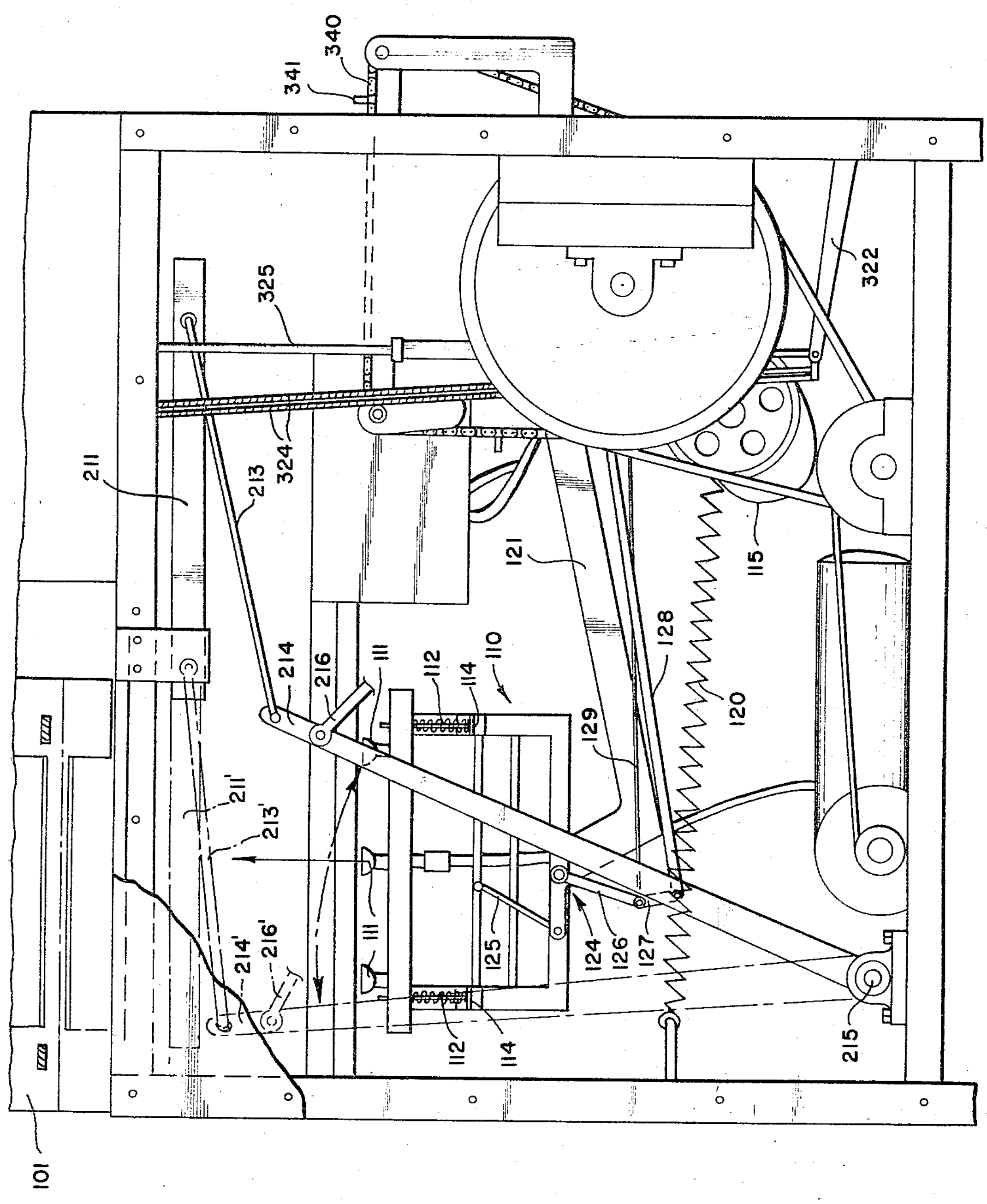
FIG. 3 is a side elevation view showing the interconnection of the mechanism in the lower portion of the machine.

FIG. 6 shows the details of the mechanism with which the vacuum cup assembly 110 is reciprocated vertically, such mechanism being shown in conjunction with the mechanism of the overall machine in FIG. 3. For this operation cam 115 is mounted on a shaft connected for rotation through motor belt and gear means to an electric motor or other power source. A double arm 116, also shown in the perspective view in FIG. 10 suspended for swinging action on transverse shaft 117 about a pivot point 118, has a roller 119 attached between the double arms. Attached to the double arm 116 immediately above roller 119 is a spring 120 connected to the frame of the machine. Attached at the upper end or opposite end from the roller of double arm 116 is rocker arm 21 further held in rigid relationship to double arm 116 by a support arm 122. Attached at the opposite end of rocker arm 121 from its connection with double arm 116, and supported thereon, is vacuum cup assembly 110.

As cam 115 is rotated, roller 119 rides on the periphery of cam 115 and is held in contact with this peripheral edge through the action of spring 120. Whenever cam 115 has so rotated that roller 119 is riding in the indentation 123 of cam 115, the structure composed of double arm 116, support arm 122 and rocker arm 121 will swing on pivot point 118 in a direction so as to raise vacuum cup assembly 110 into the position illustrated in FIGS. 2*a* and 4. As cam 115 continues to rotate and roller 119 leaves the indented portion 123, the arm structures 116, 122 and 121 are swung back in a counter-clockwise direction causing the lowering of vacuum cup assembly 110 as illustrated in FIGS. 2*b* and 5.

In conjunction with the vertical reciprocation of vacuum cup assembly 110 and the mechanism associated therewith, pins 112 are also reciprocated through the movement of arms 114. The up and down movement of arms 114 may be controlled as seen in FIG. 3 through conventional means connecting these arms to control arm linkage 124 composed of arm 125 pivotally connected to V member 126, which in turn is connected to link arm 127 pivotally connected to connecting rod 128, which in conjunction with rod 129, through conventional means changes rotating motion about pivoted points to a rotating motion applied on an end portion of each of arms 114 so as to cause that arm to rotate and pivot about its opposite end. Since this type of mechanical action is conventional, it is not considered necessary to describe it in further detail in connection with the assembly machine of the present invention.

With vacuum cup assembly 110 in its lowest position of reciprocation and the side walls of the carton blank raised and in a slightly spread position as shown in FIG. 2*c*, a reciprocating hinged conveyor, upon release of the carton by the vacuum system and vacuum cups 111, moves the carton blank to and through the second station where the locking tabs 105 are properly folded so as to be in proper form to lock with a handle section 300 when these units are mated in the subsequent third station.

The locking tabs 105 are folded through an angle of nearly 360° by folding bars 200 illustrated in perspective in FIG. 7 and in the detail view in an inverted position in FIG. 8. Folding bars 200 could also be designed to fold the locking tabs 105 through only 180°, depending upon the locking portion of the handle section 300 with which it is intended to mate the carton blank 100. The folding action takes place as the carton blank 100 is moved from between guide walls 131 to a position between cover guide members 201 which are connected by hinges 202 to the machine cover and frame. This hinge connection is made primarily to make the bottom of the folding bar 200 accessible for cleaning or repair.

As carton blank 100 is moved through the second station the top portions of the side walls of the carton blank 100 are passed between cover guide members 201, guide member 203 and twist guide member 204 shown in the section view of FIG. 8A which, by their form, bend the upper portion of each side wall so as to fold it over, forming the locking tabs 105.

The movement of the erected carton blank 100 from the first station through the second station where the locking tabs are formed, by folding, and then into position for mating with handle section 300 in the third station, is accomplished by means of a reciprocating conveyor. This conveyor has a reciprocating slide bar 211 (see FIG. 3) to which are attached pairs of hinged members 212. It will be noted from FIGS. 4 and 5 that in each pair a second hinged member 212 is connected above a first hinge member 212 and that one pair of hinged members 212 is located in a transverse relationship with a second pair of hinged members 212, each of the pair of hinged members 212 being mounted on a separate reciprocating slide bar 211 located on opposite sides of the passageway through which carton blank 100 moves through the machine. Although only one reciprocating slide bar 211 is illustrated (FIG. 3), a second reciprocating slide bar 211 is connected in a similar manner on the opposite side of the machine. Located on each slide bar 211 in a position behind each of the pair of hinged members 212 shown in FIGS. 4 and 5 is a second pair of hinged members 212 (not shown). Connected so as to move each of reciprocating slide bars 211 in conjunction with the other operations of the machine is a reciprocating conveyor pusher rod 213 pivotally connected to the outer side of each reciprocating slide bar 211. Pivotally connected at the opposite end of reciprocating pusher rod 213 is a reciprocating conveyor pivoted arm 214 which has its opposite end pivotally attached to the frame of the machine at pivot point 215. Also connected to reciprocating conveyor pivoted arm 214 at some point between its pivoted end connections is a connecting rod 216 shown in FIG. 10 connected to an eccentric rotating member 217. This connecting rod 216, through its action with eccentric rotating member 217, swings reciprocating conveyor pivoted arm 214 on its pivot point 215 between the full line and dashed line positions shown in FIG. 3.

When pivoted arm 214 is in the dashed line position shown by pivoted arm 214' through movement of attached connecting rod 216', the reciprocating conveyor pusher rod 213 is thereby moved to the position shown for pusher rod 213' which in turn moves reciprocating slide bar 211 to a position 211', whereby two pairs of hinged members 212 transversely positioned from each other are also positioned toward the outer side of the machine beneath the outer side of magazine 101. These two pairs of hinged members 212 are now so positioned that upon swinging of reciprocating conveyor pivoted arm 214' back to the position of full line pivoted arm 214 with the consequent reciprocation of slide bar 211, these two pair of hinged members 212 contact the outer edge of now erected carton blank 100 at the first station and move this carton blank 100 into the second station of the folding bars 200. The reciprocating slide bar 211 then returns to the position 211'. During this return of the reciprocating slide bar 211, the hinged members in both pairs on each slide bar will fold inward as they pass the outer surface of side walls of any of the carton blanks. In this manner the hinged members 212, which pushed the carton blank 100 from the first to the second station, will fold inward as they pass another carton blank which has now been lowered by vacuum cup assembly 110 into the first station. The hinged members 212 located further along the slide bar 211 will fold inward as they pass the outer surfaces of the side walls of the carton blank 100 now located in station two or at the entrance to said station. Upon the next reciprocal motion back to the full line position of the elements of the reciprocating conveyor, with the pushing of another carton blank 100 by hinged members 212 from the erecting station to the folding station, the second set of hinged members 212 further along reciprocating slide bar 211, composed of two pairs of transversely located hinged members, will push the carton blank in the folding area into the third or lock-up station.

It is in this third station that the steps in the assembly shown in FIGS. 2*e* and 2*f* take place. The mechanism for accomplishing the final assembly of the handle unit 300 with the carton blank 100 is illustrated in FIGS. 9–12. The reciprocating conveyor has moved a blank 100 into this third station as explained above. This erected blank 100 with prefolded locking tabs 105 is now held trapped between side plates 310 and their adjacent lock retainer plates 311. Simultaneous with the movement of carton blank 100 into this third station a handle section 300 is carried down to support bars 321. This can be done without interference to the movement of the carton blank 100 to this station since carton blank 100 moves into this station with its side walls slightly spread apart. In general, the mechanism which transports a single handle section 300 and supports the remaining units thereabove is shown in FIG. 9. A reciprocating arm 322 is attached to and reciprocated by shaft 323, which same shaft turns in conjunction with the eccentric rotating member 217 and therefore allows the dispensing of the handle section 300 to be coordinated with the movement of the reciprocating conveyor. The opposite end of reciprocating arm 322 from that attached to shaft 323 has springs 324 attached thereto for repositioning of the reciprocating arm 322 as required. Also attached to this end of the reciprocating arm 322 is control linkage 325 which extends upward to connect with the linkage shown in FIG. 9. The upper end of control linkage 325 is connected to arm 326 which has its end pivotally connected to a reciprocating plate 327 and at the same time, through conventional linkage not shown, controls the operation of the handle carriers 330 and stack support mechanisms 333.

In order to control the lowering of a handle section 300, each of handle carriers 330 has two ledge portions or transporter grip portions 331 and 332. As handle carriers 330 are being raised, gear 336 is rotated to extend stack support 337 and retract stack support 338 in order to free the bottom handle section 300. Transporter grip portions 331 and 332 snap into engagement and through the action of arm 326, through linkage 325, reciprocating plate 327 is lowered. As the plate 327 is lowered, gear 336 is returned to its initial position, thereby extending stack support 338 and retracting support 337 to drop the handle section stack into position for the next dispensing cycle.

Reciprocating plate 327 continues in its downward motion until the handle section 300 carried by the transporter handle carriers 330 is resting on support bars 321 as shown in FIGS. 11 and 12 with the handle section 300 being in dashed outline and with the carton blank 100 held beneath the curved top portions of side plates 310. Side plates 310 are connected to hinged members 334 by means of slide bearings which permit vertical movement of plates 310 with respect to members 334. Members 334 are springs biased outwardly by springs 335 and plates 310 are spring biased upwardly by springs 338. The vertical rod 342 operated by cam 217 is used to give both inward and then downward motion to plates 310 by pushing on flat bar extensions 343 of the plate 310, with cam sections 344 attached integrally with linear cam sections 345 attached to the tops of rods 342. The inward motion of linear cam sections 345 is supplied by frame mounted rollers 346. Hinged members 334 can be moved inward against the force of springs 335. By these movements of hinged members 334 and side plates 310 carton blank 100 can be moved downward after the side walls of the carton blank 100 have been moved inward so as to overlap the edges of handle section 300, thereby allowing locking tabs 105 to be inserted within the locks of handle section 300 and thus completing the assembly of the bottle carrier.

In this section of the machine, if desired, the linkage to the components shown in FIGS. 11 and 12 and in the associated figures could easily have been designed to raise support bars 321 instead of lowering side plates 310 and through this procedure cause the same locking together of carton blank 100 and handle section 300.

In the present embodiment with the lowering of carton blank 100 by side plates 310, the finished bottle carrier has been lowered so that its bottom now rests on the top horizontal surface of chain 340. A lug 341 projecting upwards from chain 340 and mounted thereon now ejects the finished carrier from the machine.

Thus through use of comparatively simple mechanisms, the present invention presents a compact and fast acting machine, and illustrates a simple method whereby a bottle or can carrier, formed from a paperboard blank or similar substance in combination with a plastic or similar substance handle section, may have its component parts quickly and conveniently erected and assembled together in a form ready for use.

It will be obvious to those skilled in the art that various changes may be made without departing from the scope of the invention and therefore the invention is not limited to what is shown in the drawings and described in the specification but only as indicated in the appended claims.

What is claimed is:

1. A machine for assembling a combination paperboard carton and plastic or similar substance handle section into a carrier for bottles or similar articles comprising:
- a holder for holding flattened carton blanks in stacked relationship,
- a suction means beneath said holder mounted for substantially vertical reciprocal motion with said suction means in contact with the bottom carton in said holder at its top position of reciprocation,
- means for erecting the side walls of the carton,
- folding means to fold over top edge portions of the carton,
- means to lower the handle section within the folded top edge portions of the carton,
- and means to move the carton and the handle section into the locking contact with each other.

2. The machine of claim 1 further characterized by: said means for erecting the side walls of the carton including walls sloping outward in an upward direction on opposite sides of said suction means.

3. The machine of claim 2 further characterized by: conveyor means beneath said suction means and said folding means in communication between both said means and with said means to lower the handle section within the folded top edge portions of the carton.

4. The machine of claim 3 further characterized by: said conveyor means including:
- a slidable means mounted for horizontal reciprocation,
- hinged members extending perpendicularly from the plane of said slidable means and hinged to fold inward into a plane parallel to said slidable means in one direction of its reciprocation,
- and at least two hinged members spaced along said slidable means.

5. The machine of claim 3 further characterized by: said folding means including guide means to fold the top edge portions of the carton through a substantially 360 degree fold.

6. The machine of claim 1 further characterized by: said means to move the carton and the handle section into locking contact with each other including: means to move the carton sides inward and the carton downward into locking contact with the handle section.

7. The machine of claim 1 further characterized by: said means to move the carton and the handle section into locking contact with each other including: means to move the carton sides inward, and means to move the handle section upward into locking contact with the carton.

8. The machine of claim 1 further characterized by: said means for erecting the side walls of the carton including: vertical projections mounted adjacent said suction means with their top ends extending above the level of said suction means at an intermediate position of reciprocation of said suction means.

9. The machine of claim 1 further characterized by: said means to lower the handle section including: at least one support bar to support the handle section within the folded top edge portions of the carton, and said means to move the carton and the handle section into locking contact with each other including: a pair of vertical side plates with their top ends curved downward located on opposite sides of said at least one support bar, a second pair of substantially vertical plates with one each of said second pair of plates located adjacent to the top portions of one each of said vertical side plates, said pair of vertical side plates mounted for movement toward each other.

10. The machine of claim 9 further characterized by: said pair of vertical side plates also mounted for downward movement.

11. The machine of claim 1 further characterized by: a first arm attached to support said suction means on one end of said first arm, a second arm attached to the opposite end of said first arm and rigidly connected at an angle to said first arm at the upper end of said second arm, a roller means rotatably mounted on the lower end of said second arm, a rotatably mounted cam located with successive points on its peripheral surface adjacent said roller means, and spring means to maintain said roller means in contact with the peripheral surface of said cam.

12. A method of assembling a combination paperboard carton and plastic or similar substance handle section into a carrier for bottles or similar articles which comprises: passing a flat paperboard carton between a pair of walls extending in planes converging toward each other in this first direction of movement of the carton, folding of the top edges of the side walls of the carton, placing of a handle section between the side walls of the carton, pressing the top edges of the side walls inward toward each other, and moving the carton top edges and the handle section into locking attachment with each other.

13. The method of claim 12 further characterized by: the folding of the top edges of the carton including the folding of the top edges through an angle of substantially 360°.

14. The method of claim 12 further characterized by: passing pins through pre-cut holes in the bottom of the carton while passing the carton between said pair of walls.

References Cited

UNITED STATES PATENTS

| | | | |
|---|---|---|---|
| 2,723,603 | 11/1955 | Chandler | 93—52 |
| 2,815,700 | 12/1957 | Bowman et al. | 93—37 |

BERNARD STICKNEY, *Primary Examiner.*